(12) United States Patent  
Herz

(10) Patent No.: US 7,593,155 B2
(45) Date of Patent: Sep. 22, 2009

(54) ACTIVE TEMPORAL MODULATION OF ULTRASHORT PULSE TRAINS USING RECONFIGURABLE OPTICAL GRATINGS

(75) Inventor: Paul Richard Herz, Santa Monica, CA (US)

(73) Assignee: Boeing Company, Chicago, IL (US)

( * ) Notice: Subject to any disclaimer, the term of this patent is extended or adjusted under 35 U.S.C. 154(b) by 61 days.

(21) Appl. No.: 11/643,048

(22) Filed: Dec. 20, 2006

(65) Prior Publication Data

US 2008/0151351 A1  Jun. 26, 2008

(51) Int. Cl.
*G02F 1/11* (2006.01)
(52) U.S. Cl. ...................................................... 359/285
(58) Field of Classification Search ................. 359/285, 359/287, 305, 307, 279, 264, 245; 356/479, 356/451, 497, 477, 484, 485, 486, 487, 491, 356/521, 515, 517
See application file for complete search history.

(56) References Cited

U.S. PATENT DOCUMENTS

| 5,623,360 A | 4/1997 | Gesell et al. |
| 5,852,702 A * | 12/1998 | Nishida et al. ............... 385/130 |
| 5,864,421 A | 1/1999 | Suzuki et al. |
| 2006/0061852 A1 * | 3/2006 | Chu et al. .................... 359/308 |

FOREIGN PATENT DOCUMENTS

| JP | 63202726 | 8/1988 |
| WO | 02071134 A1 | 9/2002 |

* cited by examiner

Primary Examiner—Ricky L Mack
Assistant Examiner—Tuyen Q Tra
(74) Attorney, Agent, or Firm—Sawyer Law Group P.C.

(57) ABSTRACT

A system and method for the temporal and phase modulation of beams through a series of electronically controlled grating modulators, as acousto optic devices (AODs), is provided where incoming electromagnetic radiation may be advanced or retarded by introducing a time delay of the associated optical phase fronts and implementing a varying chirped wave on an AOD.

40 Claims, 4 Drawing Sheets

ACTIVE TEMPORAL MODULATION OF ULTRASHORT PULSE TRAINS USING RECONFIGURABLE OPTICAL GRATINGS

FIELD OF THE INVENTION

The present embodiment relates generally to diffraction of light beams and more particularly to electromagnetic modulation using electronically controlled grating modulators.

BACKGROUND OF THE INVENTION

Laser-based optical trapping has been used to show that optical forces are capable of displacing and levitating micron-sized dielectric particles in varied materials which thereafter resulted in development of the single-beam gradient force optical trap. Strategies to dynamically affect the steering of electromagnetic beams using optical trappings to enable varied forces on trapped objects in real time were also sought. As a result, certain of those developed strategies included scanning mirrors and acousto-optic deflectors (AODs), for example.

An acousto-optic deflector (AOD) consists of a transparent crystal inside which an optical diffraction grating is generated in relation to the density changes associated with an ultrasound acoustic traveling wave. The grating period may be typically determined by the crystal's acoustic wave wavelength and the first-order diffracted light that is deflected through an angle in relation to the acoustic frequency, via $\Delta\theta=\lambda f/v$ (where $\lambda$ is the optical wavelength, v is the velocity of the acoustic wave, and f is the frequency of the acoustic wave). The relation of f/v is the inverse of the ultrasound wavelength. An AOD may be able to control the trap position via deflection as well as the stiffness via light level.

As used herein, AODs may generally be described as providing a technique for altering a path of a beam of light that often involves propagating sound waves through a solid material. As sound waves propagate through a solid material, certain properties, such as a refractive index or lattice structure of the solid material, may be altered. In this manner, a light beam incident on a solid medium may be diffracted by a portion of a crystal lattice as it propagates through a crystal. Additionally, AODs may be switched quickly (<1 ms) and may be used in conjunction with focusing optics, such that they may scan a focused spot of light across a surface of a specimen for purposes inclusive of but not limited to inspection of a semiconductor wafer, for example.

FIG. 1 is an illustrative schematic example of a tunable AOD filter 100. The tunable AOD 100 has an acousto-optic medium 110, a transducer 120, an oscillator 130 or other input signal generator, and an absorber 140. It is known to use various crystals such as tellurium dioxide ($TeO_2$) for instance as a medium in a tunable AOD. Incident light 150 is diffracted in relation to an optical $\lambda$ tuning resulting from a frequency that creates an acoustic wave in the direction at 155. The angle of deflection creates a diffracted or tuned light beam 160. Tunable AODs are therefore configurable by adjusting their characteristics in relation to frequency, wavelength, access time and beam dimensions, for instance.

An AOD may be coupled to transducer which may be configured to generate a drive signal. The drive signal may create a chirp packet which may propagate through the AOD. The chirp packet requires a finite time to form, determined by the desired length of the chirp packet and the acoustic velocity in the AOD.

AODs also have widespread applications in the field of laser microfabrication and they are normally used for intensity modulation and laser beam steering. For example, an acousto-optic modulator (AOM) is used for the optical disk recording process to modulate the intensity of the writing beam based on the video or audio signal to be recorded. AODs are also commonly used in laser direct writing systems to provide a flexible, high-speed scanning ability with good precision and accuracy. Additionally, AODs have a variety of applications in light modulating, light deflecting and light filtering technologies.

However, the use of AODs for diffraction of electromagnetic radiation is understood thus far to be limited to only a single frequency grating imposed on the AOD. Additionally it is recognized that ultrafast laser pulses experience significant spatial and temporal dispersion while propagating through acousto optic materials, and the presence of temporal dispersion limits multiphoton excitation efficacy, and is particularly severe for acousto optic devices. As a result, the incoming electromagnetic radiation is not diffracted in relation to the point of incidence such that diffraction options and applications of AOD technology have heretofore been restrictive. What is needed is a system and method to overcome these limitations such as that including temporal and phase modulation of electromagnetic pulse trains, electromagnetic beams and full beams (collectively used herein as "beams," "light beams," "beamlets," or "radiation") so as to enable the advance or retardation of incoming electromagnetic radiation by introducing a time delay of the associated optical phase fronts and implementing a varying chirped wave on an AOD.

SUMMARY OF THE INVENTION

This invention provides a system, method, and a computer program product that enables the temporal and phase modulation of beams through a series of electronically controlled grating modulators so as to enable the advance or retard of incoming electromagnetic radiation by introducing a time delay of the associated optical phase fronts and implementing a varying chirped wave on an AOD. The modulators are arranged and configured to advance or retard incoming electromagnetic radiation and reflect or transmit that radiation to other parts of the system.

An embodiment may use AODs to differentially diffract optical beams along different pathlengths, thereby introducing a time delay in the optical phase fronts. It is also envisioned that other modulation schemes may be used with the embodiments, and more particularly, additionally AOD implementations are envisioned given the quick electronic switching rates associated with AODs.

An embodiment may use a reconfigurable system for diffracting one or more light beams along non-equivalent pathlengths and generate a time delay corrected light beam, comprising: one or more acousto-optical deflectors means configured to focus said one or more light beams in a predetermined manner, an optical circulator means, a reflective means for reflecting one more deflected beams of said one or more light beams, and beam steering optics means.

An embodiment may use a reconfigurable system enabling temporal and phase modulation of electromagnetic radiation to adaptably affect one or more incident beams and thereafter direct said radiation, comprising: one or more acousto-optical deflectors being tunable and configured for each of one or more said light beams to focus said one or more light beams in a predetermined manner and each having characteristics configurable to create single or multiple chirped wave patterns on a surface of at least one of said one or more acousto-optical deflectors, wherein said patterns shall diffract said one or more light beams to predetermined angles, an optical circulator for each of one or more said light beams, a reflective mirror for each of one or more said light beams for reflecting one more deflected beams of said one or more light beams and beam steering optics, wherein a predetermined time delay is determined in relation to said predetermined manner and is directly related to said predetermined angles of said one or more light beams.

An embodiment may use a device for diffracting one or more light beams along non-equivalent pathlengths and generate a time delay corrected light beam, comprising: a plurality acousto-optical deflectors configured to focus said one or more light beams in a predetermined manner, an optical circulator, a reflective means, and beam steering optics means.

An embodiment may use a reconfigurable method for reconfigurably diffracting one or more light beams along non-equivalent pathlengths and generating a time delay corrected light beam, comprising: receiving one or more light beams incident to a circulator, directing one or more beams of received one or more light beams from said circulator to a first acousto optic device in a predetermined manner, firstly affecting said directed one or more beams in relation to characteristics of said first acousto optic deflector, secondly affecting said firstly affected beam in a second optic device means in relation to characteristics of said second optic device means, reflecting said secondly affected beam to said circulator, finally directing said reflected beam to a beam steering optic, and transmitting said finally directed beam having a corrected beam phase front.

An embodiment may use a reconfigurable computer program product stored on a computer usable medium.

As used herein, a "chirp," "chirp signal" or "chirped signal" refers to a signal in which the frequency increases ('up-chirp') or decreases ('down-chirp') in relation to time. Optically, it is recognized that ultrashort laser pulses typically exhibit chirp characteristics in part due to the dispersion of the materials that they propagate through. Additionally, in spread spectrum environments, surface acoustic waves (SAW) devices are often used to generate and demodulate the chirped signals. A surface acoustic wave (SAW) is an acoustic wave traveling along the surface of a material having some elasticity, with an amplitude that usually decays exponentially in relation to the depth of the substrate.

As used herein an AOD can be operated in "chirp mode" in which a portion of the AOD receives a wave with rapidly varying frequency ("chirp packet") and is able to focus a beam to a resulting small spot area. The chirp packet may be attained by modifying the input drive signals to AOD(s) which thereby affect a transducer of the AOD, in an embodiment hereto.

DETAILED DESCRIPTION

The present embodiment relates generally to scanning a beam of light and more particularly to the temporal and phase modulation of beams through a series of electronically controlled grating modulators so as to enable the advance or retard of incoming electromagnetic radiation by introducing a time delay of the associated optical phase fronts and implementing a varying chirped wave on an AOD. The modulators are arranged and configured to advance or retard incoming electromagnetic radiation and reflect or transmit that radiation to other parts of the system.

The following description is presented to enable one of ordinary skill in the art to make and use the embodiments herein and is provided in the context of a patent application and its requirements. Various modifications to the embodiments and the generic principles and features described herein will be readily apparent to those skilled in the art. Thus, the present embodiment is not intended to be limited to the embodiments shown, but is to be accorded the widest scope consistent with the principles and features described herein.

Figure 1:
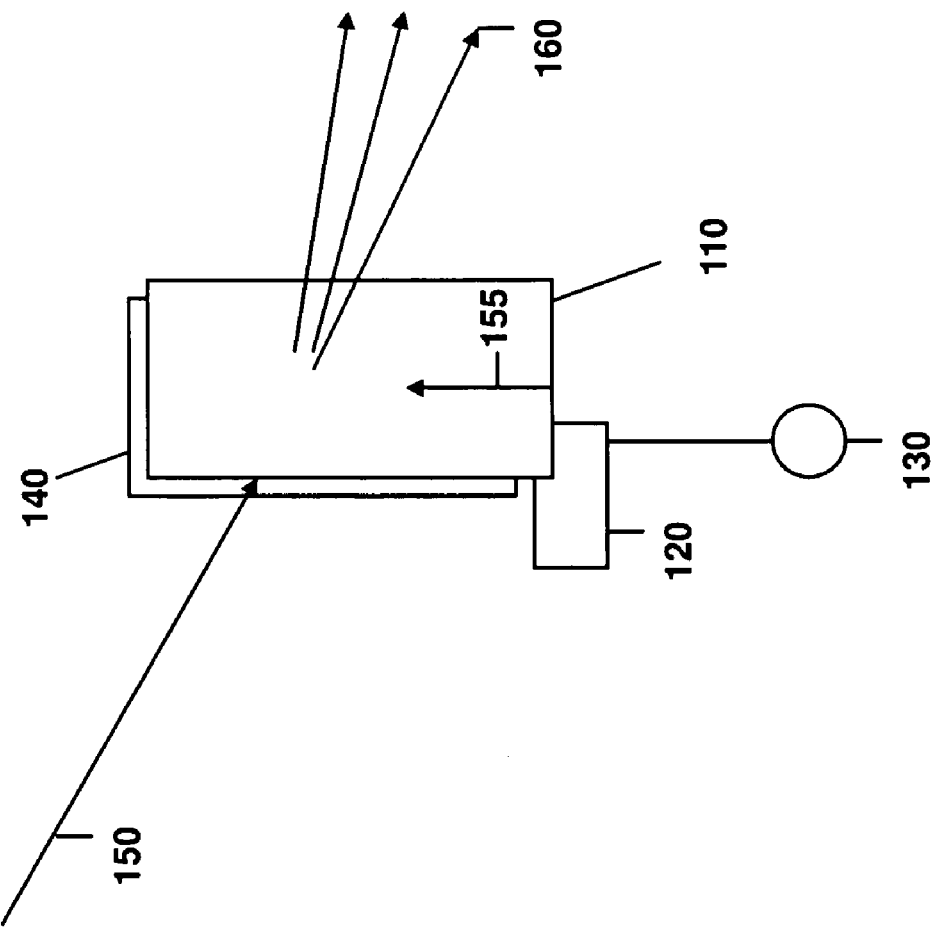
FIG. 1 is an illustrative schematic example of a tunable AOD filter.
Figure 2:
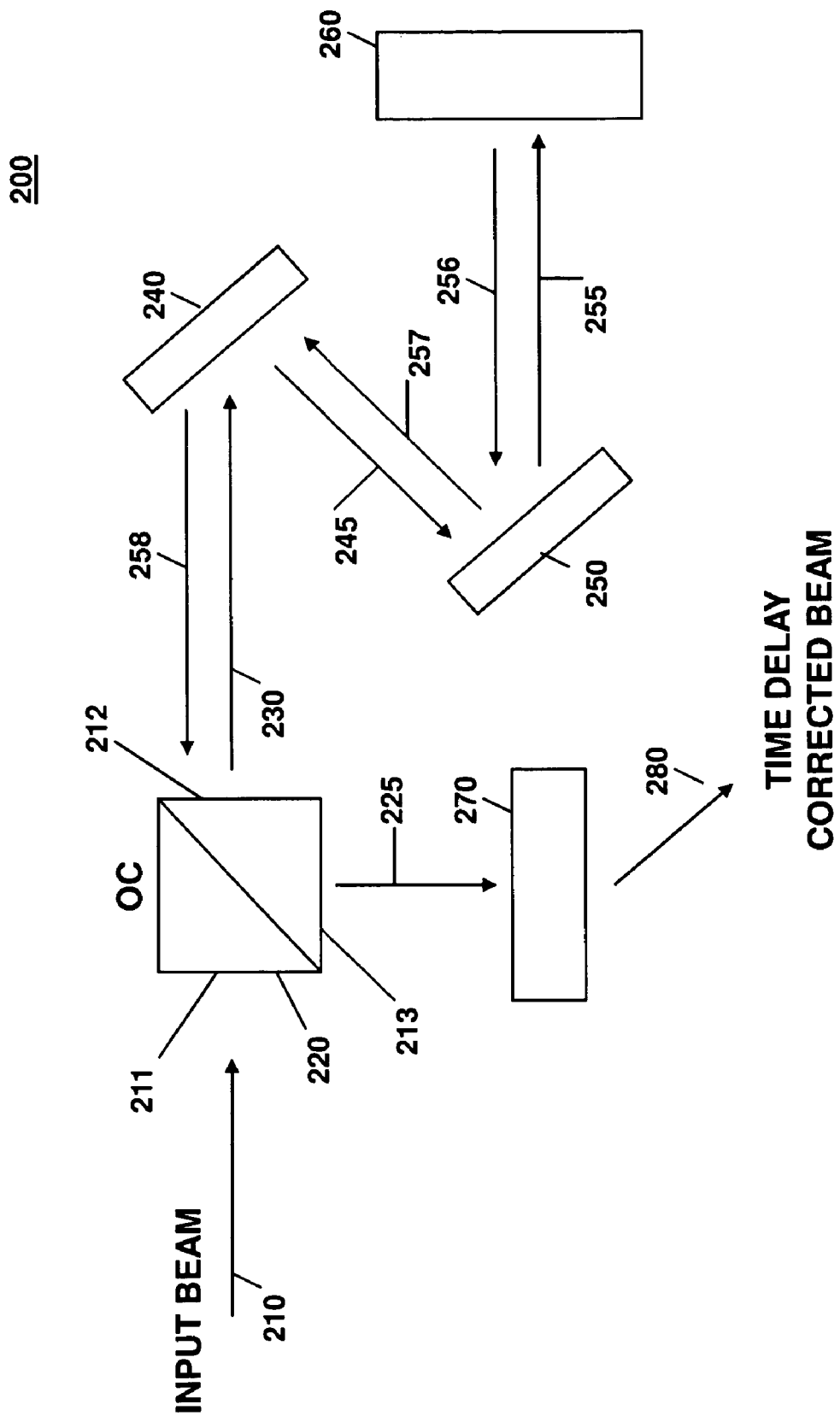
FIG. 2 illustrates a bulk free space optical configuration of an embodiment.

FIG. 2 illustrates a bulk optical configuration 200 of an embodiment. Signals 210 which form an input beam are directed into an optical circulator 220, which may be a device such as a polarization beam splitter (PBS) for example. It is also envisioned that other optic circulator means having functionality including polarization mode dispersion (PMD) and beamsplitting ability to divide unpolarized light into two orthogonally polarized beams at 90° to each other, may be used.

In FIG. 2, the transmitted signals (i.e. beam) 210 are split by the optical circulator 220. In one aspect, the beams may be split in accordance where the transmitted beam is mostly polarized parallel to the plane of incidence (i.e., p-polarized), and the reflected beam is mostly polarized perpendicular to the plane of incidence (i.e. s-polarized). For instance a beam 210 incident to a first terminal 211 is split by an optical circulator 220 with a first polarized beam 225 directed from a third terminal 213 and a second polarized beam 230 directed from a second terminal 212.

A first polarized beam 225 is directed to the beam steering optics 270 whereas a second beam 230 is directed to a first tunable AOD 240. In one aspect the first polarized beam may be a p-polarized beam and the second polarized beam may be an s-polarized beam. A second AOD at 250 is also present in the embodiment.

The set of AODs functionally act as dispersive grating elements to provide a predetermined time delay for each spatial portion of the wave 230 diffracted in relation to the spatial chirped grating on the first AOD and then the second AOD. As the beam 230 is received at the first AOD 240, each spatial portion of the wave is diffracted at a different angle, thereby providing a time delay to each spatial portion, in relation to the angle diffracted and the settings of the first AOD 240. The affected beam 245 is directed to a second AOD 250, where each spatial portion of the received wave 245 is diffracted at a different angle, thereby providing a time delay to each spatial portion, in relation to the angle diffracted and the settings of the second AOD 250. The affected second beam 255 is directed to a mirror at 260 and reflected back as 256 to the second AOD 250. Each spatial portion of the affected second beam 255, after reflection 256, is diffracted at a different angle, thereby providing a time delay to each spatial portion, in relation to the angle diffracted and the settings of the second AOD 250.

The resulting beam 258 is returned to the second terminal 212 of the optical circulator 220 and directed to the third terminal 213 and the beam steering optics 270. The beam steering optics 270 direct the time-delay-corrected beam at 280.

Although it is preferable to use AODs in the embodiment, as AODs have the benefit of electrical tunability and no moving parts, other optical delay lines (i.e., a tunable Silicon Light Machine GLV) may also be envisioned and possible. It is also desirous to use reflective optics to minimize losses throughout the system.

Figure 3:
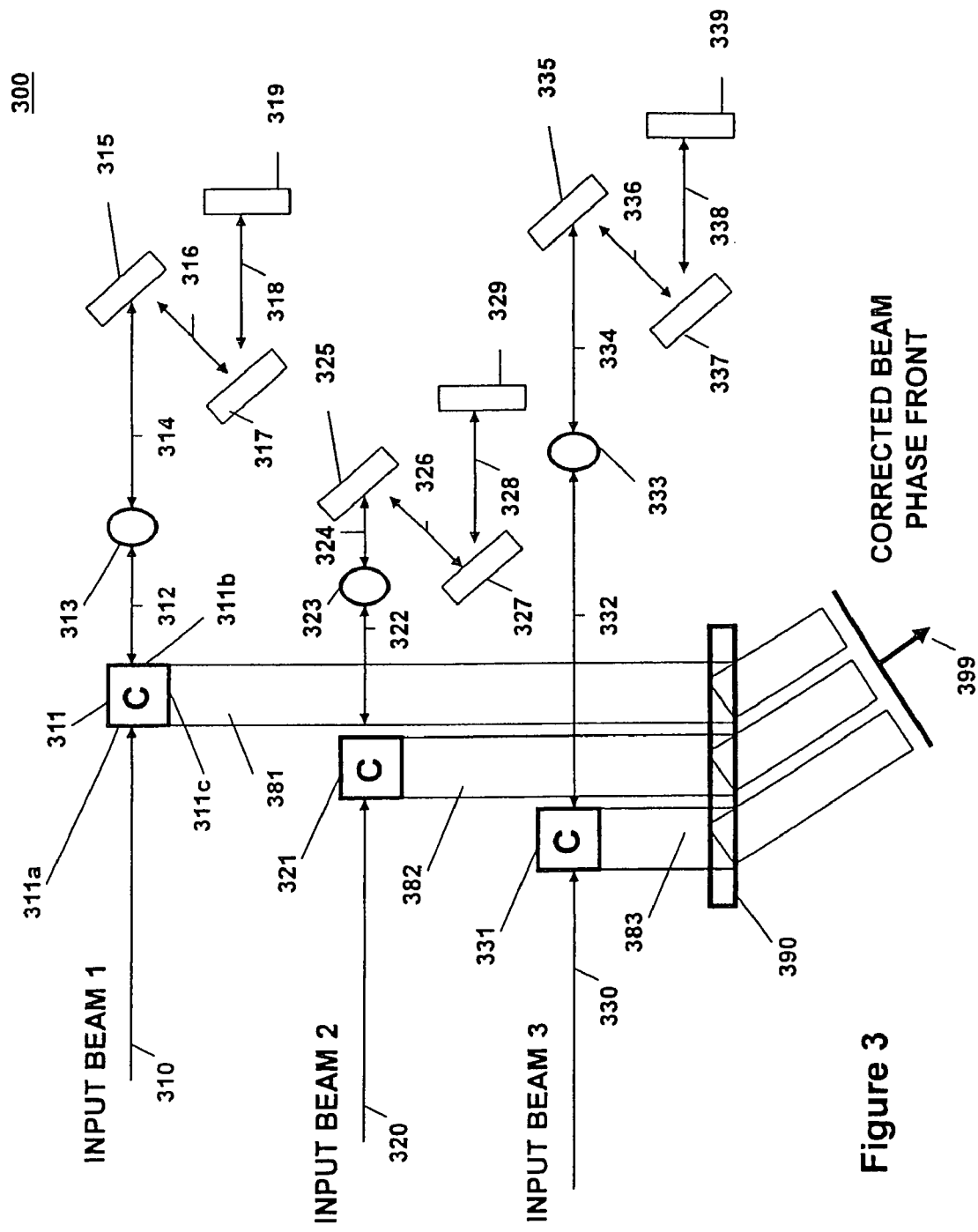
FIG. 3 illustrates a fiber optic configuration with multiple beams of an embodiment.

FIG. 3 illustrates an embodiment of a fiber optic configuration with multiple beams 300. In FIG. 3, input beams (i.e., beamlets) 310, 320 and 330, respectively are provided to fiber optic circulators 311, 321, and 331. As used herein, a fiber optic circulators may be devices that function as or are signal routers, transmitting light from an input fiber to an output fiber, and thereafter directing light that returns along the output fiber to a third port. In general it is envisioned that a fiber optic circulator may function as an isolator, protecting the input fiber from return power, as well as allowing the rejected light to be employed.

In FIG. 3, each beamlet is associated with a predetermined discrete AOD frequency that causes the beamlet to be deflected a predetermined angle to create the correct pathlength time delay for the respective beamlet.

In FIG. 3, a first beam at 310 is directed to a first terminal 311a of a first circulator 311 where the beam is then directed from a second terminal 311b towards the lens 313 at 312. The directed beam 312 is then further directed to a first AOD 315. It is desired that the first AOD functions as a grating modulator and be a tunable AOD. As the beam 314 is received at the first AOD of the first pathway 315, the beam is diffracted at a predetermined angle, thereby providing a corrected pathlength time delay, in relation to the discrete AOD frequency of the first AOD of the first pathway 315. The affected beam 316 is directed to a second AOD of the first pathway 317, where the beam is diffracted at a predetermined angle, thereby providing a corrected pathlength time delay, in relation to the discrete AOD frequency of the second AOD of the first pathway 317. The resulting beam 318 is then reflected from the mirror 319 and returned to the circulator 311. Upon return to the circulator 311, the reflected beam 318 is received by the circulator's second terminal 311b and is directed to a third terminal 311c therein so it may exit the system at 381 towards the beam steering optics 390. The methodology of the first beam is also repeated for other beams 320 and 330. Circulators 321, 331 of FIG. 3 are intended to comprise first, second and third terminals similar to those previously described above for circulator 311. In FIG. 3, a second beam 320 is directed to a first terminal of a second circulator 321 where the second beam is directed to the lens 323 at 322. The directed beam 324 is then further directed to a first AOD of the second pathway 325. It is desired that the first AOD of the second pathway functions as a grating modulator and be a tunable AOD. As the beam 324 is received at the first AOD of the second pathway 325, the beam is diffracted at a predetermined angle, thereby providing a corrected pathlength time delay, in relation to the discrete AOD frequency of the first AOD of the second pathway 325. The affected beam 326 is directed to a second AOD 327 of the second pathway, where the beam is diffracted at a predetermined angle, thereby providing a corrected pathlength time delay, in relation to the discrete AOD frequency of the second AOD of the second pathway 327. The resulting beam 328 is then reflected from the mirror 319 and returned to the circulator 321. Upon return to the circulator 321, the reflected beam 328 is received by the circulator's second terminal and is directed to a third terminal therein so it may exit the system at 382 towards the beam steering optics 390.

In FIG. 3, a third beam 330 is directed to a first terminal of a third circulator 331 where the third beam is directed to the lens 333 at 332. The directed beam 334 is then further directed to a first AOD of the third pathway 335. It is desired that the first AOD of the third pathway function as a grating modulator and be a tunable AOD. As the beam 334 is received at the first of the third pathway AOD 335, the beam is diffracted at a predetermined angle, thereby providing a corrected pathlength time delay, in relation to the discrete AOD frequency of the first AOD of the third pathway 335. The affected beam 326 is directed to a second AOD of the third pathway 337, where the beam is diffracted at a predetermined angle, thereby providing a corrected pathlength time delay, in relation to the discrete AOD frequency of the second AOD of the third pathway 337. The resulting beam 338 is then reflected from the mirror 339 and returned to the circulator 331. Upon return to the circulator 331, the reflected beam 338 is received by the circulator's second terminal and is directed to a third terminal therein so it may exit the system at 383 towards the beam steering optics 390.

In FIG. 3, the reflected beams are received at the beam steering optics 390 and a corrected beam phase front 399, having corrected pathlength time delays, is produced by the system.

Figure 4:
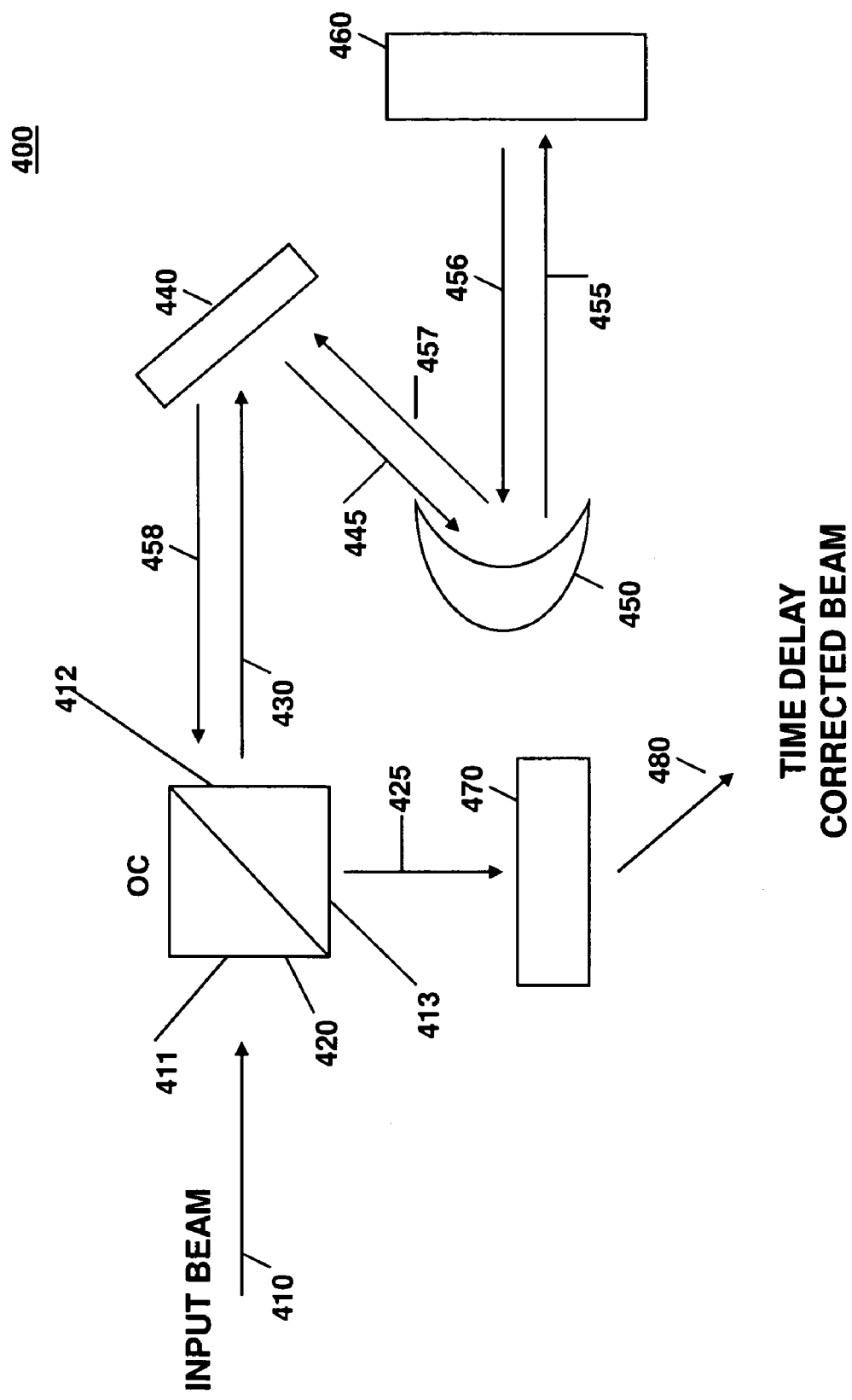
FIG. 4 illustrates a configuration with single SAW device and reflective.

FIG. 4 illustrates a configuration with single SAW device and reflective lens for an embodiment. Signals 410 which form an input beam are directed into an optical circulator 420, which may be a device such as a polarization beam splitter (PBS) for example. It is also envisioned that other optic circulators having functionality including polarization mode dispersion (PMD) and beamsplitting ability to divide unpolarized light into two orthogonally polarized beams at 90° to each other, may be used.

In FIG. 4, the transmitted signals (i.e. beam) 410 are split by the optical circulator 420. In one aspect, the beams may be split in accordance where the transmitted beam is mostly polarized parallel to the plane of incidence (i.e., p-polarized), and the reflected beam is mostly polarized perpendicular to the plane of incidence (i.e. s-polarized). For instance a beam 410 incident to a first terminal 411 is split by an optical circulator 420 with a first polarized beam 425 directed from a third terminal 413 and a second polarized beam 430 directed from a second terminal 412.

A first polarized beam is directed at 425 to the beam steering optics 470 whereas a second beam is directed at 430 to a tunable AOD 440. In one aspect the first polarized beam may be a p-polarized beam and the second polarized beam may be an s-polarized beam. A reflective lens at 450 is also present in the embodiment.

The AOD functionally acts as a dispersive grating element to provide a predetermined time delay for each spatial portion of the wave 430 diffracted in relation to the spatial chirped grating on the AOD. As the beam 430 is received at the AOD 440, each spatial portion of the wave is diffracted at a different angle, thereby providing a time delay to each spatial portion, in relation to the angle diffracted and the settings of the first AOD 440. The affected beam 445 is directed to a reflective lens 450, which may be one or more lenses, to compensate for beam spreading which may occur.

The reflective lens 450 redirects the beam 455 to the mirror 460 and the reflected beam 456 is reflected from the reflective lens 450 as 457. The reflective beam 457 is reflected collinearly and promotes the efficient coupling of light into the system. The reflected beam 457 is returned to the second terminal 412 of the circulator 420 as 458, and is then directed from the third terminal 413 to the beam steering optics 470 by the circulator 420. The beam steering optics 470 direct the time-delay-corrected beam as 480.

In each of the embodiments, it is envisioned that the AOD may be set to predetermined characteristics to enable a user to configure and customize the system to fit their unique needs. Additionally, the ability to quickly configure AODs as an element of the system also enables a user to have a reconfigurable and reusable system for a variety of applications.

Advantages

This invention has several applications in the field of electromagnetic radiation and communication, including the areas of antennas, beam steering, analog optical time modulation, beam steering applications, laser communication use, directed beam energy areas and analog temporal modulation of optical pulses. Additionally, modulation of the electromagnetic wavefronts with the fast, reconfigurable system herein will enable the realization of applications not previously possible.

It is also envisioned that a chirped wave pattern can be employed by permanent methods (i.e., etching, grating templates). However, although such is contemplated herein and is functionally disclosed herein, when such is implemented within an AOD, a rapid reconfiguration of the chirped wave pattern based on the system requirements is possible. The chirped wave pattern can be realized by multiple methods using single or multiple AODs by configuration of the AOD hardware design or by modification of the input drive signals to the AODs.

It is envisioned that one or more AODs may be operated in deflection mode, where the drive signal duration is longer than the propagation time of an acoustic wave across the light beam. It is further envisioned that one or more AODs may be operated in chirp mode, where the drive signal duration is approximately equal to the propagation time of the acoustic wave across the beam.

A lens may be a travelling lens, a reflex lens, a reflective lens or any other lens as may be known or become known in the art.

An embodiment herein may also include additional optical components that have not been pictorially or textually set forth, heretofore. For example, additional optical components may include, but may not be limited to, beam splitters, quarter wave plates, polarizers such as linear and circular polarizers, rotating polarizers, rotating analyzers, collimators, focusing lenses, mirrors, dichroic mirrors, partially transmissive mirrors, filters such as spectral or polarizing filters, spatial filters, reflectors, and modulators. Each of these additional optical components may be disposed within the system or may be coupled to any of the components of the system as described herein.

Although the present embodiment has been described in accordance with the embodiments shown, one of ordinary skill in the art will readily recognize that there could be variations to the embodiments and those variations would be within the spirit and scope of the present embodiment. For example, implementations of a laser and communications systems and features described above can be implemented in any type of commercial offerings and system application. Accordingly, many modifications may be made by one of ordinary skill in the art without departing from the spirit and scope of the appended claims.

What is claimed is:

1. A reconfigurable system for diffracting one or more light beams along non-equivalent pathlengths and generating a time delay corrected light beam, comprising:
   one or more acousto-optic deflector means being tunable and configured to focus each one of one or more said light beams in a predetermined manner and each of one or more said acousto-optical deflector means having characteristics configurable to create wave patterns on a surface of at least one of one or more said acousto-optic deflectors, wherein the patterns shall diffract one or more said light beams to predetermined angles,
   an optical circulator means for sending one or more of said light beams to one or more of said acousto-optic deflector means,
   a reflective means for reflecting one or more of one or more said light beams received from one or more of said acousto-optic deflector means, and
   beam steering optics means for directing said reflected light beams,
   wherein a time delay is determined in relation to said predetermined angles and is related to said predetermined angles of one or more said light beams.

2. The system of claim 1, wherein said acousto-optic deflector means is an acousto-optic deflector.

3. The system of claim 2, wherein said predetermined manner includes one or more chirped wave patterns on one or more said acousto-optic deflectors' surface.

4. The system of claim 2, wherein said system comprises a plurality of acousto-optic deflectors, each having characteristics configurable to create single or multiple chirped wave patterns on a surface of at least one of said plurality, wherein said patterns shall diffract one or more said light beams to predetermined angles.

5. The system of claim 2, wherein said circulator means is a polarizing device, said reflecting means is a mirror, and said beam steering optic means is a beam steering optic.

6. The system of claim 5, wherein said polarizing device is polarization beam splitter.

7. The system of claim 2, wherein one or more said acousto-optic deflectors provide a predetermined time delay for each spatial portion of each of one or more said light beams.

8. The system of claim 7, wherein each of one or more said light beams is diffracted in relation to a spatial chirped grating on one or more said acousto-optic deflectors.

9. The system of claim 8, wherein said predetermined time delay is determined in relation to said predetermined manner and is directly related to said diffraction angle of one or more said light beams.

10. The system of claim 9, wherein at least one spatial portion of one or more said light beams is angularly diffracted so as to provide a time delay to said spatial portion.

11. The system of claim 9, wherein said beam steering optic means produces said time delay corrected light beam.

12. The system of claim 2, wherein said system comprises one acousto-optic deflector being tunable and one reflective lens for recollimating one or more said light beams.

13. A reconfigurable system enabling temporal and phase modulation of electromagnetic radiation to adaptably affect one or more light beams and thereafter direct said radiation, comprising:
   one or more acousto-optic deflectors being tunable and configured for each of one or more said light beams to focus one or more said light beams in a predetermined manner and each of one or more said acousto-optic deflectors having characteristics configurable to create single or multiple chirped wave patterns on a surface of at least one of one or more said acousto-optic deflectors, wherein said patterns shall diffract one or more said light beams to predetermined angles,
   an optical circulator to send one or more of said light beams to one or more of said acousto-optic deflectors,
   a reflective mirror for each of one or more said light beams for reflecting one or more of said light beams received from one or more of said acousto-optic deflectors, and
   beam steering optics to direct said reflected light beams, wherein, a predetermined time delay is determined in relation to said predetermined manner and is directly related to said predetermined angles of one or more said light beams.

14. The system of claim 13, wherein one or more said acousto-optic deflectors provide a predetermined time delay for each spatial portion of each of one or more said light beams.

15. The system of claim 14, wherein said beam steering optic means produces said time delay corrected light beam.

16. The system of claim 15, wherein said system comprises one acousto-optic deflector and one reflective lens for recollimating one or more said light beams.

17. The system of claim 16, wherein said system temporally advances one or more said light beams.

18. The system of claim 16, wherein said system temporally retards one or more said light beams.

19. The system of claim 16, wherein said system temporally reflects or transmits said one or more light beams to other system parts as diffracted light beams.

20. The system of claim 16, wherein said beam steering optic means produces said time delay corrected light beam.

21. The system of claim 20, wherein said systems further comprises one or more lenses for each of one or more said light beams.

22. The system of claim 13, wherein each of one or more said light beams is diffracted in relation to a single chirped wave patterns on said one or more acousto-optic deflectors.

23. The system of claim 13, wherein each of one or more said light beams is diffracted in relation to a multiple chirped wave patterns one or more said acousto-optic deflectors.

24. The system of claim 23, wherein at least one spatial portion of one or more said light beams is angularly diffracted so as to provide a time delay to said spatial portion.

25. A system for generating a time delay corrected light beam from a plurality of light beamlets, comprising, for each of said plurality of light beamlet:
one or more acousto-optic deflectors being tunable and configured for each of plurality of said light beamlets to focus one or more said light beamlets in a predetermined manner and each having characteristics configurable to create single or multiple chirped wave patterns on a surface of at least one of one or more said acousto-optic deflectors, wherein said patterns shall diffract said plurality of light beamlets to predetermined angles in relation to said characteristics,
an optical circulator for sending each of said plurality of light beamlets to one or more of said acousto-optic deflectors,
a reflective mirror for reflecting said plurality beamlets received from one or more of said acousto-optic deflectors, and
beam steering optics to direct said reflected light beams, wherein, a predetermined time delay is determined in relation to said characteristics and is directly related to said predetermined angles.

26. The system of claim 25, wherein said circulator is a fiber optic circulator.

27. The system of claim 26, wherein at least one of one or more said acousto-optic deflectors is tunable.

28. A method for reconfigurably diffracting one or more light beams along non-equivalent pathlengths and generating a time delay corrected light beam, comprising:
receiving one or more light beams incident to a circulator,
directing one or more beams of received one or more light beams from said circulator to a first acousto-optic device means in a predetermined manner,
firstly affecting said directed one or more light beams in relation to characteristics of said first acousto-optic device means,
secondly affecting said firstly affected light beam in a second acousto-optic device means in relation to characteristics of said second acousto-optic device means,
reflecting said secondly affected light beam to said circulator,
finally directing said reflected light beam to a beam steering optic, and
transmitting said finally directed beam having a corrected beam phase front.

29. The method of claim 28, wherein said second acousto-optic device means is a tunable acousto-optic deflector.

30. The method of claim 29, wherein said acousto-optic device means are configured for each of one or more said light beams to focus one or more said light beams in a predetermined.

31. The method of claim 28, further comprising the step of recollimating said reflected beam.

32. The method of claim 31, wherein the step of reflecting includes a reflective mirror.

33. A computer program product stored on a computer readable medium for causing a computer to control an execution of an application; the computer program product including program instructions for generating a time delay corrected beam using single or multiple chirped wave patterns on one or more acousto-optic deflectors surfaces to diffract one or more light beams comprising:
receiving one or more light beams incident to a circulator,
directing one or more light beams of received one or more light beams from said circulator to a first acousto-optic device in a predetermined manner,
firstly affecting said directed one or more light beams in relation to characteristics of said first acousto-optic deflector,
secondly affecting said firstly affected light beam in a second optic device means in relation to characteristics of said second acousto-optic device means,
reflecting said secondly affected light beam to said circulator,
finally directing said reflected light beam to a beam steering optic, and
transmitting said finally directed light beam having a corrected beam phase front.

34. The product of claim 33, wherein said product may be instantiated by or otherwise in communication with a processor.

35. The product of claim 33, wherein said second acousto-optic device means is a tunable acousto-optic deflector.

36. The product of claim 33, wherein said acousto-optical deflectors are configured for each of one or more said light beams to focus said one or more light beams in a predetermined.

37. The product of claim 36, further comprising the step of recollimating said reflected beam.

38. A device for diffracting one or more light beams along non-equivalent pathlengths and generate a time delay corrected light beam, comprising:
a plurality of acousto-optic deflectors being configured to focus each one of one or more said light beams in a predetermined manner and each of said plurality of acousto-optical deflectors having characteristics configurable to create wave patterns on a surface of at least one or said plurality of acousto-optic deflectors, wherein the patterns shall diffract one or more of said light beams to predetermined angles, an optical circulator to send each of one or more said light beams to said plurality of acousto-optic deflectors, a reflective means for each of one or more said light beams for reflecting one or more deflected beams of one or more said light beams, and beam steering optics means to direct said reflected light beams, wherein a time delay is determined in relationship to the predetermined angles and is related to said predetermined angles of said one or more said light beams.

39. The device of claim 38, wherein said predetermined manner includes one or more chirped wave patterns on one or more said acousto-optic deflectors' surface.

40. The device of claim 39, wherein said acousto-optic deflectors are configurable to create single or multiple chirped wave patterns on each of their respective surfaces, wherein said patterns shall diffract one or more said light beams to predetermined angles.

* * * * *